United States Patent
Song (10) Patent No.: US 12,431,589 B2
(45) Date of Patent: Sep. 30, 2025

(54) MULTILAYER SEPARATOR FOR LITHIUM SECONDARY BATTERY CAPABLE OF PREVENTING SHORT-CIRCUIT AND MANUFACTURING METHOD THEREOF

(71) Applicants: HYUNDAI MOTOR COMPANY, Seoul (KR); KIA CORPORATION, Seoul (KR)

(72) Inventor: Jong Chan Song, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 668 days.

(21) Appl. No.: 17/857,779

(22) Filed: Jul. 5, 2022

(65) Prior Publication Data

US 2023/0024377 A1    Jan. 26, 2023

(30) Foreign Application Priority Data

Jul. 9, 2021  (KR) .................. 10-2021-0090062

(51) Int. Cl.
| | |
|---|---|
| H01M 4/44 | (2006.01) |
| H01M 10/052 | (2010.01) |
| H01M 50/403 | (2021.01) |
| H01M 50/446 | (2021.01) |
| H01M 50/449 | (2021.01) |
| H01M 50/451 | (2021.01) |
| H01M 50/454 | (2021.01) |
| H01M 50/457 | (2021.01) |
| H01M 50/489 | (2021.01) |

(52) U.S. Cl.
CPC ....... *H01M 50/457* (2021.01); *H01M 10/052* (2013.01); *H01M 50/403* (2021.01); *H01M 50/446* (2021.01); *H01M 50/449* (2021.01); *H01M 50/451* (2021.01); *H01M 50/454* (2021.01); *H01M 50/489* (2021.01); *H01M 2220/20* (2013.01)

(58) Field of Classification Search
CPC ............. H01M 50/446; H01M 50/449; H01M 50/451; H01M 50/454; H01M 50/457
See application file for complete search history.

(56) References Cited

U.S. PATENT DOCUMENTS

| | | | |
|---|---|---|---|
| 2015/0188109 A1* | 7/2015 | Kim .................... | H01M 50/457 429/144 |
| 2016/0233487 A1* | 8/2016 | Jun ......................... | H01M 4/13 |
| 2020/0303706 A1* | 9/2020 | Smith ................. | H01M 10/052 |
| 2020/0343511 A1* | 10/2020 | Nagao ................. | H01M 50/454 |
| 2021/0175580 A1* | 6/2021 | Amos ................... | H01M 4/131 |
| 2022/0271338 A1* | 8/2022 | Kamine ................ | H01M 50/44 |

(Continued)

FOREIGN PATENT DOCUMENTS

| | | |
|---|---|---|
| KR | 10-1256968 B1 | 4/2013 |
| KR | 10-1639020 B1 | 7/2016 |

OTHER PUBLICATIONS

Cho (KR 2019/0141392): translation plus original (Year: 2019).*
Wang (CN 11584843): translation plus original (Year: 2020).*

*Primary Examiner* — Jeremiah R Smith
(74) *Attorney, Agent, or Firm* — MCDONNELL BOEHNEN HULBERT & BERGHOFF LLP (57) ABSTRACT

Disclosed herein are a multilayer separator for a lithium secondary battery capable of preventing an internal short-circuit due to growth of lithium dendrite, and a method of manufacturing the same.

18 Claims, 7 Drawing Sheets

(56) References Cited

U.S. PATENT DOCUMENTS

2022/0367854 A1\* 11/2022 Song ................ H01M 4/58
2023/0278868 A1\* 9/2023 Ying ............ C04B 35/62892
429/247

\* cited by examiner

MULTILAYER SEPARATOR FOR LITHIUM SECONDARY BATTERY CAPABLE OF PREVENTING SHORT-CIRCUIT AND MANUFACTURING METHOD THEREOF

CROSS REFERENCE TO RELATED APPLICATIONS

This application claims under 35 U.S.C. § 119(a) the benefit of priority to Korean Patent Application No. 10-2021-0090062 filed on Jul. 9, 2021, the entire contents of which are incorporated herein by reference.

BACKGROUND

(a) Technical Field

The present disclosure relates to a multilayer separator for a lithium secondary battery capable of preventing an internal short-circuit due to growth of lithium dendrite, and a method of manufacturing the same.

(b) Background Art

As a next-generation lithium secondary battery with high capacity and high energy, batteries using lithium metal negative electrodes are getting attention. A lithium metal battery, a lithium sulfur battery, and a lithium air battery are representative examples.

Since lithium metal used as a negative electrode has a low density (0.54 g·cm$^{-3}$) and a low standard reduction potential (−3.040 V vs. SHE), it is possible to implement a high theoretical capacity (3860 mAh/g) and a high energy density per volume/weight. However, the lithium metal battery has major problems such as lithium dendrite formation and low coulombic efficiency.

When the lithium dendrite grows to pass through a separator, an internal short-circuit may occur to cause safety problems such as fire and explosion. Therefore, in order to realize a high-performance and high-safety lithium metal battery, a strategy for inhibiting growth of the lithium dendrite and inducing uniform lithium growth is necessary.

Currently, since a polyolefin-based porous membrane used in the existing lithium ion battery is directly used in the lithium metal battery as a separator, the lithium metal battery cannot solve a short-circuit problem due to the lithium dendrite.

SUMMARY

The present disclosure has been made in an effort to solve the above-described problems associated with prior art.

In one aspect, the present disclosure provides a separator for a lithium secondary battery capable of preventing an internal short-circuit by inhibiting growth of lithium dendrite.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

In an exemplary embodiment, the present disclosure provides a separator for a lithium secondary battery, which includes a lower layer, an intermediate layer, and an upper layer, wherein the intermediate layer includes at least one lithiophilic material selected from the group consisting of graphitic carbon nitride, phosphorous-doped graphitic carbon nitride, boron-doped graphitic carbon nitride, and a combination thereof.

The lower layer may include a polyolefin-based polymer.

The intermediate layer may further include at least one binder selected from the group consisting of poly(acrylic acid) (PAA), polyvinylidene fluoride (PVDF), poly(vinylidene fluoride-co-hexafluoropropylene) (PVDF-HFP), and a combination thereof.

The intermediate layer may include the lithiophilic material and the binder at a mass ratio ranging from 9:1 to 5:5.

A thickness of the intermediate layer may range from 100 nm to 5 µm.

The intermediate layer may further include a nonwoven fabric, and pores of the nonwoven fabric may be filled with the lithiophilic material.

The upper layer may include a polyolefin-based polymer.

A thickness of the separator may range from 10 µm to 100 µm.

In another exemplary embodiment, the present disclosure provides a lithium secondary battery including a positive electrode, a negative electrode containing a lithium metal, and the separator located between the positive electrode and the negative electrode.

In still another exemplary embodiment, the present disclosure provides a method of manufacturing a separator for a lithium secondary battery, which includes preparing a starting material containing a carbon nitride precursor compound and a phosphorus precursor compound, reacting the starting material and preparing phosphorous-doped graphitic carbon nitride, preparing a solution containing the phosphorous-doped graphitic carbon nitride and a binder, applying the solution onto one surface of a lower layer and forming an intermediate layer, and stacking an upper layer on the intermediate layer.

The starting material may include 50 wt % to 90 wt % of the carbon nitride precursor compound and 10 wt % to 50 wt % of the phosphorus precursor compound.

The carbon nitride precursor compound may include at least one selected from the group consisting of melamine, dicyanamide, urea, and a combination thereof.

The phosphorus precursor compound may include at least one selected from the group consisting of hexachlorotriphosphazene, aminoethylphosphonic acid, phosphoric acid, and a combination thereof.

The manufacturing method may include reacting the starting material in an inert atmosphere at a temperature ranging from 400° C. to 700° C. for two to six hours.

A mass ratio of the phosphorous-doped graphitic carbon nitride and the binder may range from 9:1 to 5:5.

According to the manufacturing method, the solution may be applied onto one surface of the lower layer, and vacuum may be applied to the other surface of the lower layer to vacuum filter the solution to form the intermediate layer.

Other aspects and preferred embodiments of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limiting of the present disclosure, and wherein.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

The above and other objectives, features, and advantages of the present disclosure will become more apparent from the following description of preferred embodiments with reference to the accompanying drawings. However, the present disclosure is not limited to the embodiments disclosed herein and may be implemented in other forms. The embodiments disclosed herein will be provided to make this disclosure thorough and complete, and will fully convey the spirit of the present disclosure to those skilled in the art.

In describing each drawing, similar reference numerals are assigned similar components. In the accompanying drawings, dimensions of structures are shown in an enlarged scale for clarity of the present disclosure. Although terms "first," "second," and the like may be used herein to describe various components, these components should not be limited to these terms. The terms are used only for the purpose of distinguishing one component from another component. For example, without departing from the scope of the present disclosure, a first component may be referred to as a second component, and similarly, a second component may also be referred to as a first component. Unless the context clearly dictates otherwise, the singular form includes the plural form.

It should be understood that the terms "comprise," "include," and "have" specify the presence of stated herein features, numbers, steps, operations, components, elements, or combinations thereof, but do not preclude the presence or possibility of adding one or more other features, numbers, steps, operations, components, elements, or combinations thereof. In addition, when a portion of a layer, a film, a region, a plate, or the like is referred to as being "on" other portion, this includes not only a case in which the portion is "directly on" the other portion but also a case in which another portion is present between the portion and the other portion. Contrarily, when a portion of a layer, a film, a region, a plate, or the like is referred to as being "under" other portion, this includes not only a case in which the portion is "directly under" the other portion but also a case in which another portion is present between the portion and the other portion.

Unless otherwise specified, all numbers, values, and/or expressions indicating ingredients, reaction conditions, polymer compositions, and quantities of combination products used herein are approximations to which various uncertainties of measurement are reflected, wherein the various uncertainties occur in obtaining these values among essentially different other things so that it should be understood that all numbers, values, and/or expressions are modified by a term "about." In addition, when a numerical range is disclosed herein, such a numerical range is continuous and, unless otherwise indicated, the numerical range includes all values from a minimum value to a maximum value. Further, when the numerical range refers to integers, unless otherwise indicated, all integers from a minimum value to a maximum value are included.

Figure 1:
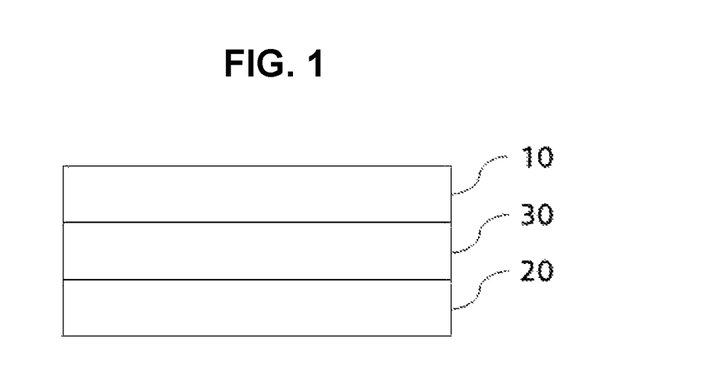
FIG. 1 is a schematic diagram illustrating a lithium secondary battery according to the present disclosure.

FIG. 1 is a schematic diagram illustrating a lithium secondary battery according to the present disclosure. Referring to the drawing, the lithium secondary battery may include a positive electrode 10, a negative electrode 20, a separator 30 located between the positive electrode 10 and the negative electrode 20, and an electrolyte (not shown) impregnated in the separator 30.

Hereinafter, each component of the lithium secondary battery will be described in detail.

Positive Electrode

The positive electrode 10 may include a positive electrode active material, a binder, and a conductive agent.

The positive electrode active material may include any one or more selected from the group consisting of lithium cobalt oxide, lithium nickel cobalt manganese oxide, lithium nickel cobalt aluminum oxide, lithium iron phosphate, lithium manganese oxide, and a combination thereof. However, the positive electrode active material is not limited thereto, and any positive electrode active material available in the art may be used.

The binder is a component that assists in bonding of the positive electrode active material and the conductive agent and in bonding to the current collector and may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluororubber, and various copolymers.

The conductive agent is not particularly limited as long as it has electrical conductivity without causing a chemical change in a battery. For example, the conductive agent may include graphite including natural graphite and artificial graphite; carbon-based materials including carbon black, acetylene black, ketjen black, channel black, furnace black, lamp black, and summer black; conductive fibers including a carbon fiber and a metal fiber; metal powders including a carbon fluoride powder, an aluminum powder, and a nickel powder; conductive whiskeys including zinc oxide and potassium titanate; a conductive metal oxide including titanium oxide; and a conductive material including a polyphenylene derivative.

Negative Electrode

The negative electrode 20 may include a lithium metal layer and an interface layer located on the lithium metal layer.

The lithium metal layer may include lithium metal or a lithium metal alloy.

The lithium metal alloy may include lithium and an alloy of a metal or a metalloid capable of alloying with lithium.

The metal or the metalloid capable of alloying with lithium may include Si, Sn, Al, Ge, Pb, Bi, and Sb.

The lithium metal has a large electric capacity per unit weight and is advantageous for implementation of a high-capacity battery. However, since dendrite in a resin phase grows during deposition and dissolution processes of the lithium ion, the lithium metal may cause a short-circuit between the positive electrode 10 and the negative electrode 20. In addition, since the lithium metal has high reactivity with the electrolyte, the lifespan of the battery may be reduced due to a side reaction between the lithium metal and the electrolyte. Meanwhile, since the lithium metal has a large volume change during the charging/discharging processes, lithium desorption may occur from the negative electrode 20.

Thus, according to the present disclosure, a kind of a lithium affinity layer capable of strongly interacting with lithium ions in the separator 30 to induce lithium to grow in a plane direction is formed so that the above problems are prevented from occurring.

Separator

Figure 2:
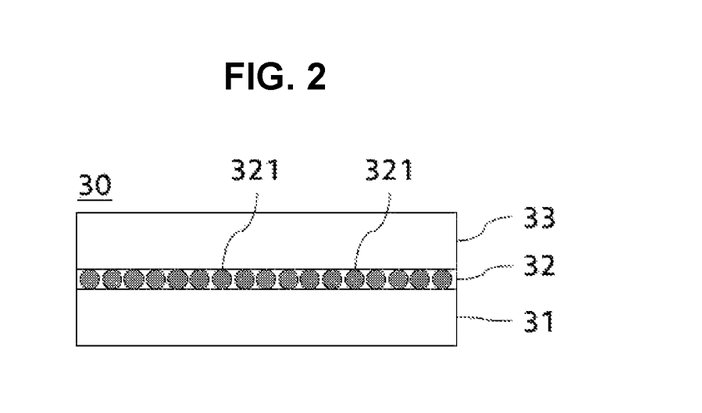
FIG. 2 is a diagram illustrating a separator according to a first embodiment of the present disclosure.

FIG. 2 is a diagram illustrating the separator 30 according to a first embodiment of the present disclosure. Referring to the drawing, the separator 30 may be formed by sequentially stacking a lower layer 31, an intermediate layer 32, and an upper layer 33.

The lower layer 31 may be a porous membrane including a polyolefin-based polymer.

The polyolefin-based polymer may include any one polyolefin-based polymer as long as it can be widely used in the technical field to which the present disclosure pertains and may include, for example, polypropylene, polyethylene, and the like.

A pore size of the lower layer 31 is not particularly limited and may be, for example, 1 μm or less.

The upper layer 33 may be a porous membrane including a polyolefin-based polymer.

The polyolefin-based polymer may include any one polyolefin-based polymer as long as it can be widely used in the technical field to which the present disclosure pertains and may include, for example, polypropylene, polyethylene, and the like.

A pore size of the upper layer 33 is not particularly limited and may be, for example, 1 μm or less.

The intermediate layer 32 may include a lithiophilic material 321 capable of interacting with lithium ions.

In the present specification, the term "interaction" means to include not only electrostatic attraction between the lithiophilic material 321 and lithium ions, but also orbital hybridization formed between the lithiophilic material 321 and an adatom of a lithium element electrodeposited on the negative electrode 20.

Figure 3A:
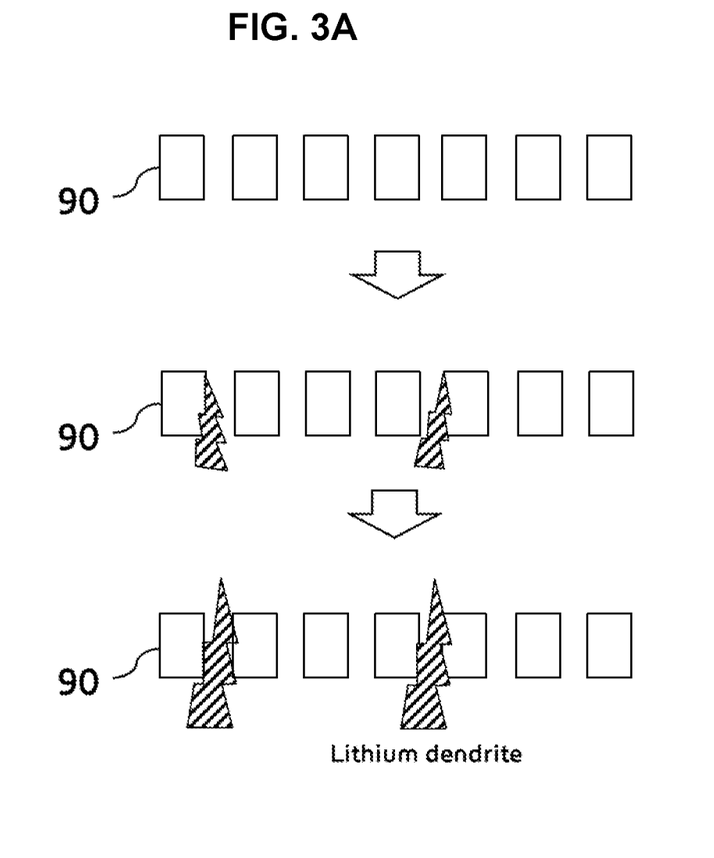
FIG. 3A is a reference diagram for describing growth of lithium dendrite when a conventional separator which does not include a lithiophilic material as in the present disclosure is used.

FIG. 3A is a reference diagram for describing growth of lithium dendrite when a conventional separator 90 which does not include the lithiophilic material as in the present disclosure is used. Referring to the drawing, the separator 90 is not able to prevent lithium dendrite from growing through pores of the separator 90.

Figure 3B:
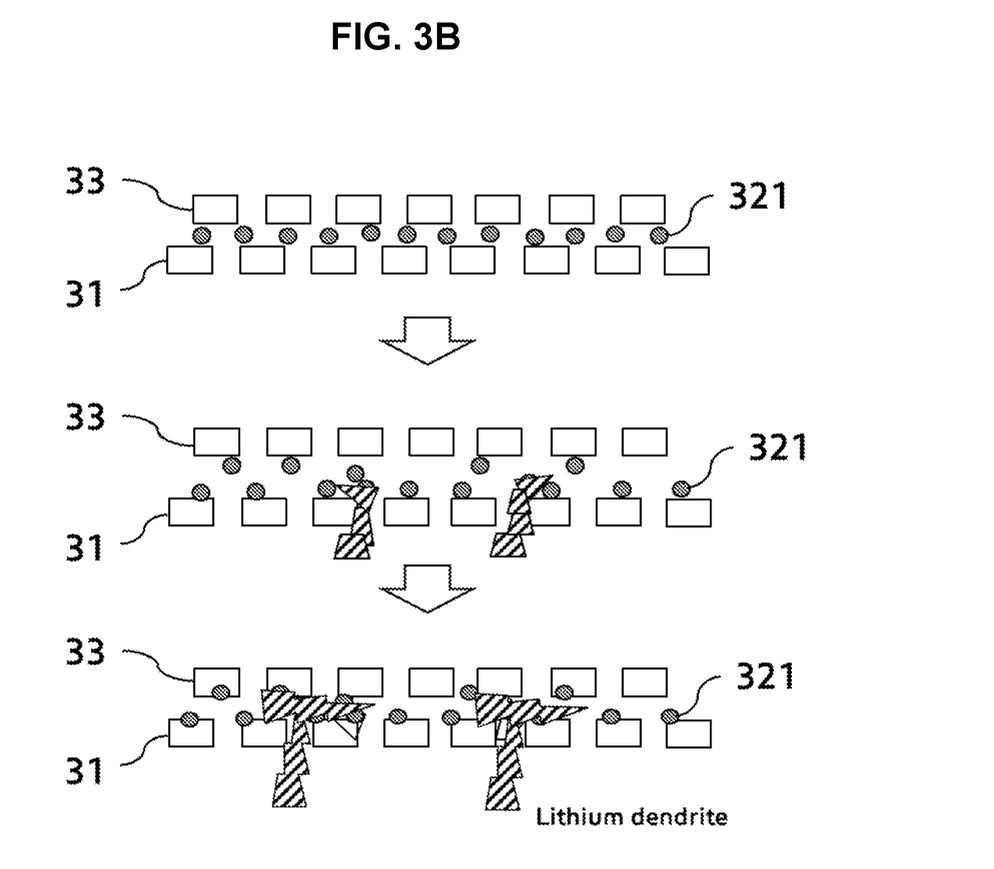
FIG. 3B is a reference diagram for describing the growth of the lithium dendrite when a separator including the lithiophilic material as in the present disclosure is used.

FIG. 3B is a reference diagram for describing the growth of the lithium dendrite when the separator including the lithiophilic material 321 as in the present disclosure is used. Referring to the drawing, the lithium dendrite growing through the pores of the lower layer 31 comes into contact with the lithiophilic material, and a tendency of the lithium dendrite to grow in the plane direction instead of a thickness direction of the separator is increased. As a result, according to the present disclosure, the growth of the lithium dendrite to pass through the upper layer 33 may be suppressed. A detailed description thereof will be described below.

The lithiophilic material 321 may include at least one selected from the group consisting of graphitic carbon nitride, phosphorous-doped graphitic carbon nitride, boron-doped graphitic carbon nitride, and a combination thereof. Preferably, the lithiophilic material 321 may include phosphorous-doped graphitic carbon nitride capable of strong interaction with lithium ions.

The phosphorous-doped graphitic carbon nitride may be expressed by Formula 1 below.

Formula 1

In the present specification, "doping" means that a phosphorus element P is inserted into a chemical structure of graphitic carbon nitride to form a compound, and specifically, the "doping" means that a part of a carbon element C constituting the graphitic carbon nitride is substituted with the phosphorus element P.

The phosphorous-doped graphitic carbon nitride includes the phosphorus element having electronegativity that is lower than electronegativity of the carbon element. Therefore, in the phosphorous-doped graphitic carbon nitride, electrons are biased to a nitrogen element having high electronegativity, and thus energy of electrons is further strengthened when compared with general graphitic carbon nitride. Therefore, the interface layer according to the present disclosure may have stronger interaction with lithium ions.

In addition, a phosphorous element in the phosphorous-doped graphitic carbon nitride has five outermost electrons, and thus there is an unshared electron pair remaining even after bonding with the surrounding nitrogen elements. Therefore, the adatom of lithium ions electrodeposited on the surface of the lithium metal layer by passing through the interface layer and the unshared electron pair of the phosphorus element form orbital hybridization to strongly interact with each other. Therefore, the adatom of lithium ions is willing to grow in a direction capable of interacting as much as possible with the phosphorous-doped graphitic carbon nitride of the interface layer. That is, in the negative electrode according to the present disclosure, the lithium tends to grow in the plane direction.

The intermediate layer 32 may further include a binder. The binder may include at least one selected from the group consisting of poly(acrylic acid) (PAA), polyvinylidene fluoride (PVDF), poly(vinylidene fluoride-co-hexafluoropropylene) (PVDF-HFP), and a combination thereof.

The intermediate layer 32 may include the lithiophilic material 321 and the binder at a mass ratio ranging from 9:1 to 5:5. When the mass ratio of the binder is less than 1, the intermediate layer 32 may not be properly formed, and when the mass ratio of the binder exceeds 5, it may be difficult to implement the above-described effect.

A thickness of the intermediate layer 32 may range from 100 nm to 5 μm. When the thickness of the intermediate layer 32 is the same as above, the above-described effect may be implemented without interfering with movement of lithium ions.

Figure 4:
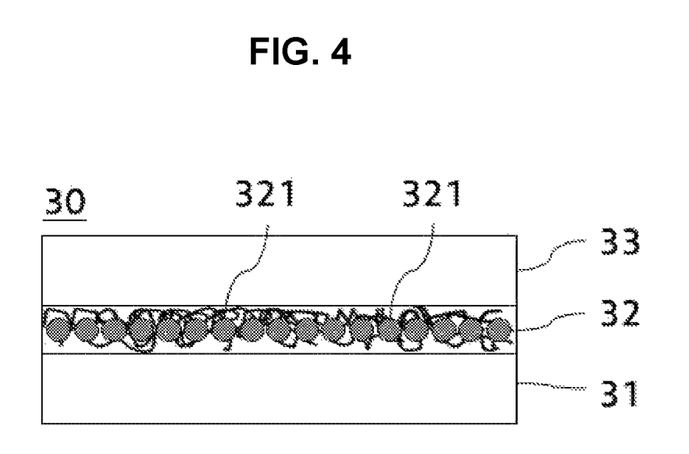
FIG. 4 is a diagram illustrating a separator according to a second embodiment of the present disclosure.

FIG. 4 is a diagram illustrating the separator 30 according to a second embodiment of the present disclosure. Referring to the drawing, in the separator 30, the intermediate layer 32 includes a nonwoven fabric containing pores, and the pores of the nonwoven fabric are filled with the lithiophilic material 321.

A material of the nonwoven fabric is not particularly limited, and any material may be used as long as it can be used for the separator.

Electrolyte

The electrolyte is a component responsible for the movement of lithium ions between the positive electrode 10 and a negative electrode 20 and may include a lithium salt, an organic solvent, and an additive.

The electrolyte may be impregnated in all or a part of the positive electrode 10 and the separator 30.

The lithium salt is not particularly limited and may include lithium bis(trifluoromethanesulfonyl)imide (LiTFSI).

A concentration of the lithium salt is also not limited and may be controlled within the range of 0.1 M to 5.0 M. In the above range, the electrolyte may have appropriate conductivity and viscosity, and lithium ions may effectively move in the lithium secondary battery of the first embodiment. However, this is merely an example, and the present disclosure is not limited thereto.

The organic solvent may be a solvent in which 1,3-dioxolane (DOL) and dimethoxy ethane (DME) may be mixed at a volume ratio ranging from 3:7 to 7:3, specifically 5:5 to 7:3.

The additive may include any additive used in the technical field to which the present disclosure pertains as long as it does not violate the desired effect of the present disclosure and may include, for example, $LiNO_3$.

A method of manufacturing a separator according to the present disclosure may include preparing a starting material containing a carbon nitride precursor compound and a phosphorus precursor compound, reacting the starting material and preparing phosphorous-doped graphitic carbon nitride, preparing a solution containing the phosphorous-doped graphitic carbon nitride and a binder, applying the solution onto one surface of a lower layer and forming an intermediate layer, and stacking an upper layer on the intermediate layer.

The carbon nitride precursor compound may include at least one selected from the group consisting of melamine, dicyanamide, urea, and a combination thereof.

The phosphorus precursor compound may include at least one selected from the group consisting of hexachlorotriphosphazene, aminoethylphosphonic acid, phosphoric acid, and a combination thereof.

The starting material may include 50 wt % to 90 wt % of the carbon nitride precursor compound and 10 wt % to 50 wt % of the phosphorus precursor compound. When the content of the phosphorus precursor compound exceeds 50 wt %, a content of a phosphorus element in the phosphorous-doped graphitic carbon nitride is too high, and thus the intermediate layer may be densified.

The phosphorous-doped graphitic carbon nitride may be prepared by reacting the starting material in an inert atmosphere such as nitrogen gas at a temperature ranging from 400° C. to 700° C. for two to six hours.

Thereafter, a solution containing the phosphorous-doped graphitic carbon nitride and the binder at a mass ratio ranging 9:1 to 5:5 may be prepared, and the solution may be applied onto one surface of the lower layer to form the intermediate layer.

The intermediate layer may be formed by various methods, and preferably, the solution may be applied onto one surface of the lower layer, and then vacuum may be applied to the other surface of the lower layer to vacuum filter the solution to form the intermediate layer. Through the vacuum filtration method, a very thin intermediate layer at a level of several hundred nanometers may be formed without cracks.

Thereafter, the upper layer may be stacked and bonded to the intermediate layer to form the separator.

Hereinafter, the present disclosure will be described in detail with reference to the following Example and Comparative Example. However, the technical spirit of the present disclosure is not restricted or limited thereto.

Manufacturing Example

Melamine and hexachlorotriphosphazene, which were starting materials, were uniformly mixed at a mass ratio of 70:30 and undergone heat treatment in an inert atmosphere of argon gas at a temperature of about 550° C. for about four hours, thereby synthesizing phosphorous-doped graphitic carbon nitride (hereinafter referred to as "PCN").

Figure 5A:
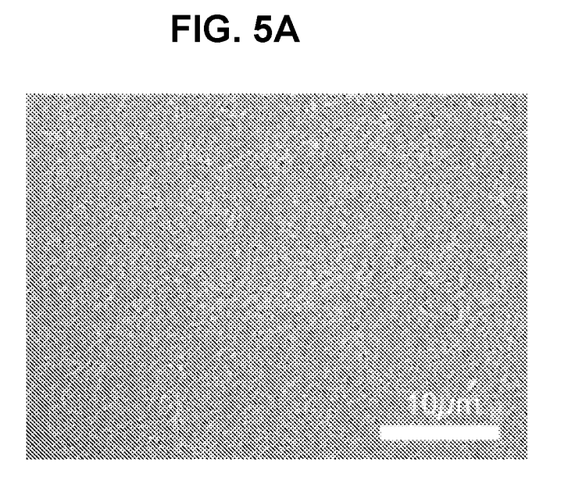
FIG. 5A is a diagram illustrating a result of analyzing a surface of an intermediate layer included in the separator using a scanning electron microscope (SEM) according to the present disclosure.
Figure 5B:
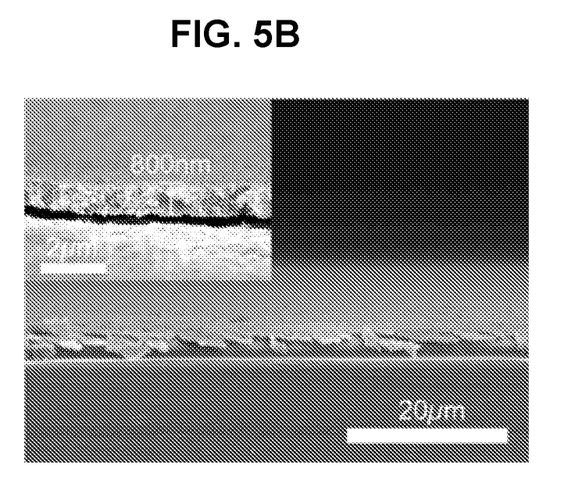
FIG. 5B is a diagram illustrating a result of analyzing a cross section of the intermediate layer included in the separator using the SEM according to the present disclosure.

A solvent was prepared by dispersing 1.2 mg of a mixture containing PCN and PAA as a binder at a mass ratio of 5:5 in 30 ml of a mixed solvent containing water and isopropyl alcohol at a volume ratio of 95:5. The solvent was applied onto one side of the lower layer, and the intermediate layer having a thickness of about 800 nm was formed through a vacuum filtration method. FIG. 5A is a diagram illustrating a result of analyzing a surface of an intermediate layer using a scanning electron microscope (SEM), and FIG. 5B is a diagram illustrating a result of analyzing a cross section of the intermediate layer using the SEM. Referring to the drawings, it can be seen that the intermediate layer was uniformly manufactured without defects.

The upper layer was stacked on the intermediate layer and pressed to complete the separator. In this case, a porous membrane containing polyethylene was used as the lower layer and the intermediate layer, and a thickness of the finished separator was about 32 μm.

EXAMPLE

A lithium metal with a thickness of about 45 μm was prepared as a negative electrode. A positive electrode containing $LiNi_{0.8}Mn_{0.1}Co_{0.1}O_2$ (NMC811) that is a positive electrode active material was prepared. The negative electrode, the separator of Manufacturing Example, and the positive electrode were sequentially stacked, and then about 41 μl of 2.5 M LiFSI in DME was injected as an electrolyte into the separator to manufacture a cell.

Comparative Example

A cell was manufactured in the same manner as in Example, except that a polyethylene separator having a thickness of about 30 μm coated with aluminum oxide ($Al_2O_3$) was used as the separator.

Experimental Example 1

Figure 6:
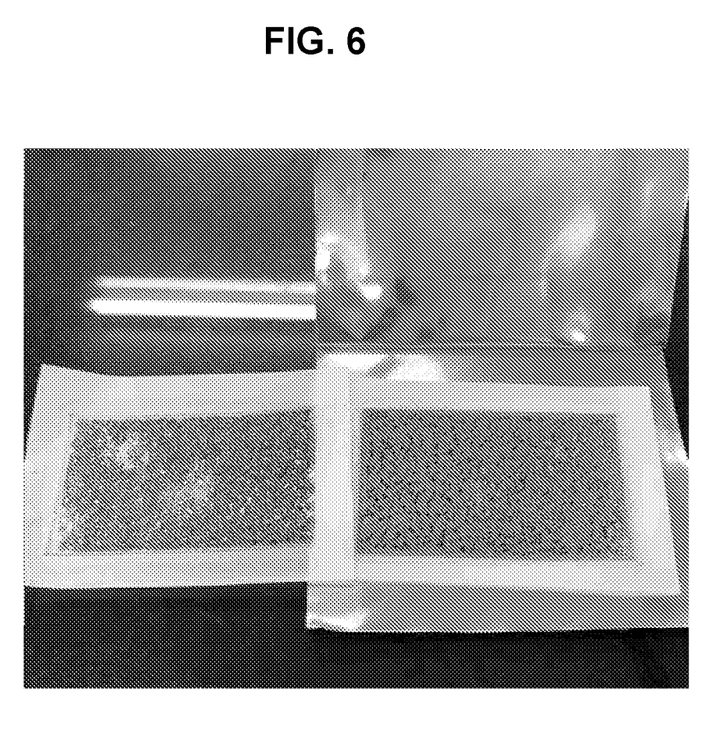
FIG. 6 is a diagram illustrating an observation of the separator included in the lithium secondary battery after charging and discharging according to Experimental Example 1.

The cell according to Example was charged and discharged twice in a condition of 0.1C charging-0.1C discharging, and then the cell was disassembled to remove the separator. Then, it was checked whether lithium dendrite was collected in the intermediate layer of the separator. The results are shown in FIG. 6. A left photograph of FIG. 6 shows the separator observed from the upper layer, and a right photograph of FIG. 6 shows the separator observed from the lower layer.

Referring to FIG. 6, the lithium dendrite growing by passing through the separator was not found, and this means that the lithium dendrite came into contact with the lithiophilic material included in the intermediate layer to be collected in the intermediate layer.

Experimental Example 2

Figure 7A:
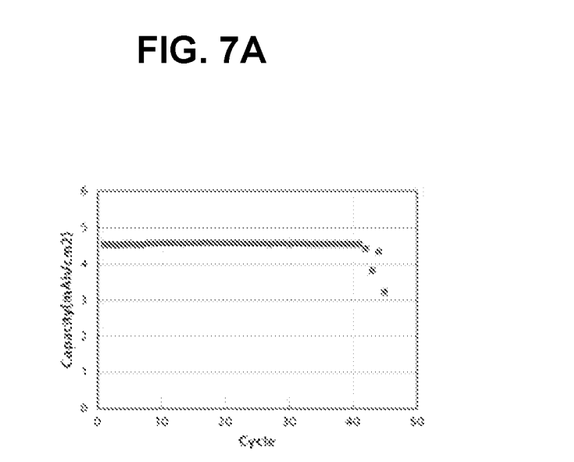
FIG. 7A is a graph showing a result of measuring a lifespan of a cell according to Comparative Example.
Figure 7B:
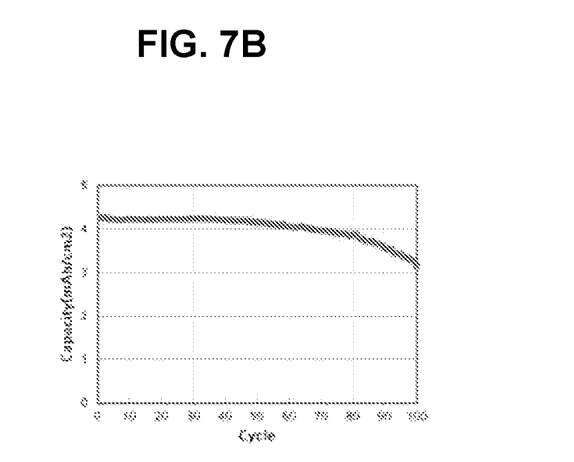
FIG. 7B is a graph showing a result of measuring a lifespan of a cell according to Example.

The cells according to Example and Comparative Example were charged and discharged in a condition of ⅓C charging-⅓C discharging, and then the lifespans thereof were measured. FIG. 7A shows a result of Comparative Example, and FIG. 7B shows a result of Example.

Referring to the drawings, it can be seen that a short-circuit occurred in the cell of Comparative Example about 46 times, whereas the cell of Example exhibited a capacity retention rate of about 80% even after about 95 times of charging and discharging.

In accordance with the present disclosure, since growth of lithium dendrite can be effectively suppressed, durability and safety of a lithium secondary battery can be improved.

The effects of the present disclosure are not limited to the above-described effects. It should be understood that the effects of the present disclosure include all effects which can be inferred from the above description.

As is described above, while the present disclosure has been shown and described with reference to specific embodiments thereof, various changes and modification may be derived by those skilled in the art from the above description. For example, it should be understood that an appropriate result may be achieved even when the techniques described herein may be performed in a different order than the described methods, and/or that components are coupled or combined in a form different from the described methods, or substituted or replaced with other components or equivalents. Therefore, other implementations, other embodiments, and equivalents to the appended claims fall within the scope of the following claims.

The invention claimed is:

1. A separator for a lithium secondary battery, comprising:
    a lower layer, an intermediate layer, and an upper layer;
    wherein the intermediate layer includes at least one lithiophilic material selected from the group consisting of: phosphorous-doped graphitic carbon nitride, boron-doped graphitic carbon nitride, and a combination thereof.

2. The separator of claim 1, wherein the lower layer is a porous membrane containing a polyolefin-based polymer.

3. The separator of claim 1, wherein the intermediate layer further includes at least one binder selected from the group consisting of: poly(acrylic acid) (PAA), polyvinylidene fluoride (PVDF), poly(vinylidene fluoride-co-hexafluoropropylene) (PVDF-HFP), and a combination thereof.

4. The separator of claim 3, wherein the intermediate layer includes the lithiophilic material and the binder at a mass ratio ranging from 9:1 to 5:5.

5. The separator of claim 1, wherein a thickness of the intermediate layer ranges from 100 nm to 5 μm.

6. The separator of claim 1, wherein:
    the intermediate layer further includes a nonwoven fabric; and
    pores of the nonwoven fabric are filled with the lithiophilic material.

7. The separator of claim 1, wherein the upper layer is a porous membrane containing a polyolefin-based polymer.

8. The separator of claim 1, wherein a thickness of the separator ranges from 10 μm to 100 μm.

9. A lithium secondary battery, comprising:
    a positive electrode;
    a negative electrode containing a lithium metal; and
    the separator according to claim 1, which is located between the positive electrode and the negative electrode.

10. A method of manufacturing the separator of claim 1, comprising:
    preparing a starting material containing a carbon nitride precursor compound and a phosphorus precursor compound;
    reacting the starting material and preparing phosphorous-doped graphitic carbon nitride;
    preparing a solution containing the phosphorous-doped graphitic carbon nitride and a binder;
    applying the solution onto one surface of the lower layer thereby forming the intermediate layer; and stacking the upper layer on the intermediate layer, thereby forming the separator.

11. The method of claim 10, wherein the starting material includes 50 wt % to 90 wt % of the carbon nitride precursor compound and 10 wt % to 50 wt % of the phosphorus precursor compound.

12. The method of claim 10, wherein the carbon nitride precursor compound includes at least one selected from the group consisting of: melamine, dicyanamide, urea, and a combination thereof.

13. The method of claim 10, wherein the phosphorus precursor compound includes at least one selected from the group consisting of: hexachlorotriphosphazene, aminoethylphosphonic acid, phosphoric acid, and a combination thereof.

14. The method of claim 10, wherein the starting material is reacted in an inert atmosphere at a temperature ranging from 400° C. to 700° C. for two to six hours.

15. The method of claim 10, wherein the binder includes at least one selected from the group consisting of: poly(acrylic acid) (PAA), polyvinylidene fluoride (PVDF), poly(vinylidene fluoride-co-hexafluoropropylene) (PVDF-HFP), and a combination thereof.

16. The method of claim 10, wherein a mass ratio of the phosphorous-doped graphitic carbon nitride and the binder ranges from 9:1 to 5:5.

17. The method of claim 10, wherein the solution is applied onto one surface of the lower layer, and vacuum is applied to the other surface of the lower layer to vacuum filter the solution to form the intermediate layer.

18. The method of claim 10, wherein a thickness of the intermediate layer ranges from 100 nm to 5 µm.

\* \* \* \* \*